July 6, 1965
C. O. LEYDIG ET AL
3,192,695
TREE TRIMMING MACHINE OR THE LIKE
Filed Feb. 25, 1963
4 Sheets-Sheet 1
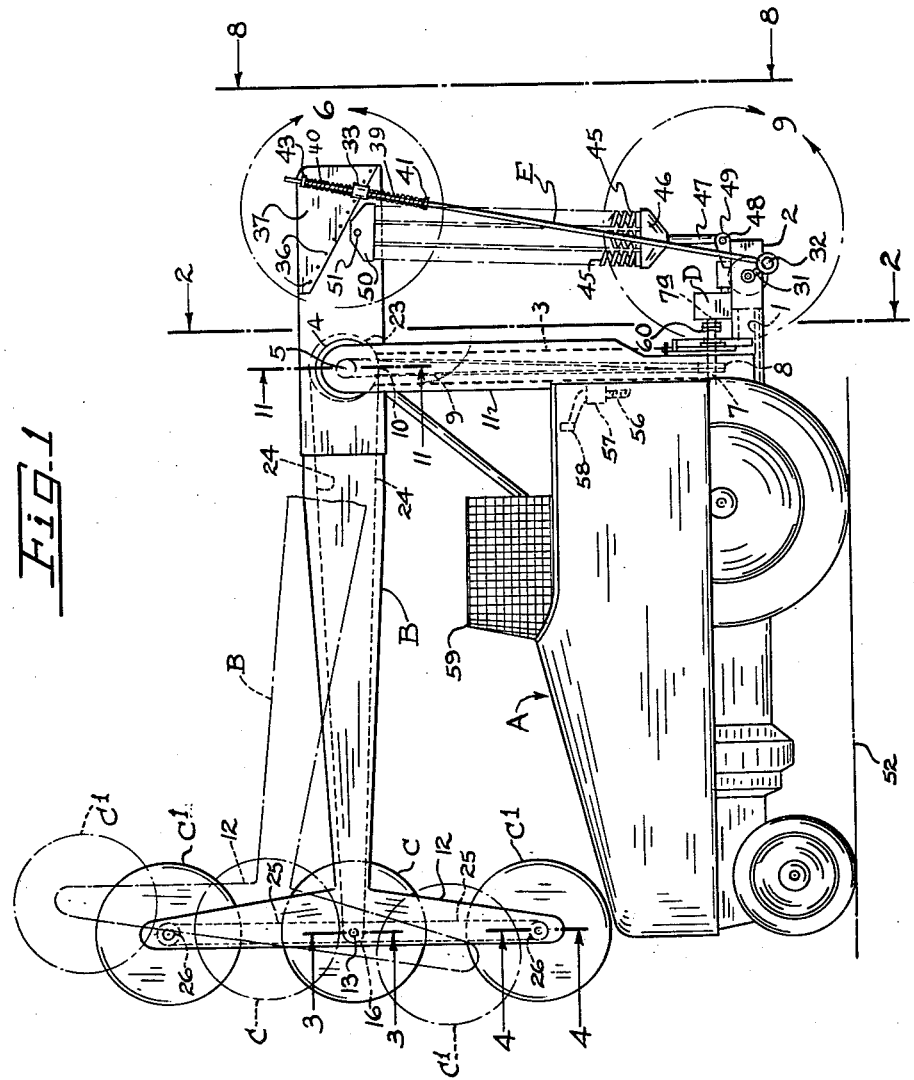
INVENTORS
CLYDE O. LEYDIG
YIGAL MICHELSON
BY
William R. Piper
ATTORNEY

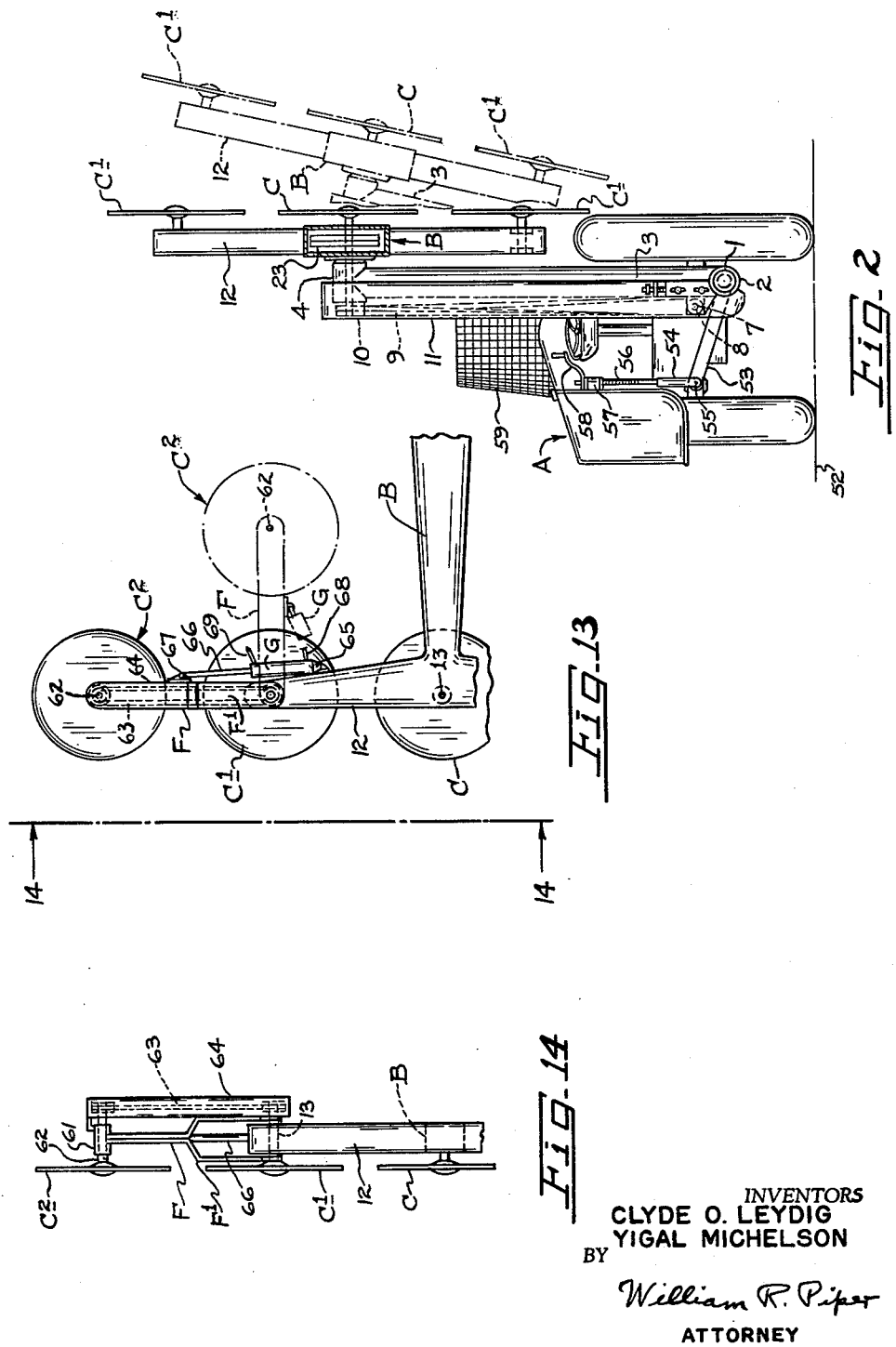

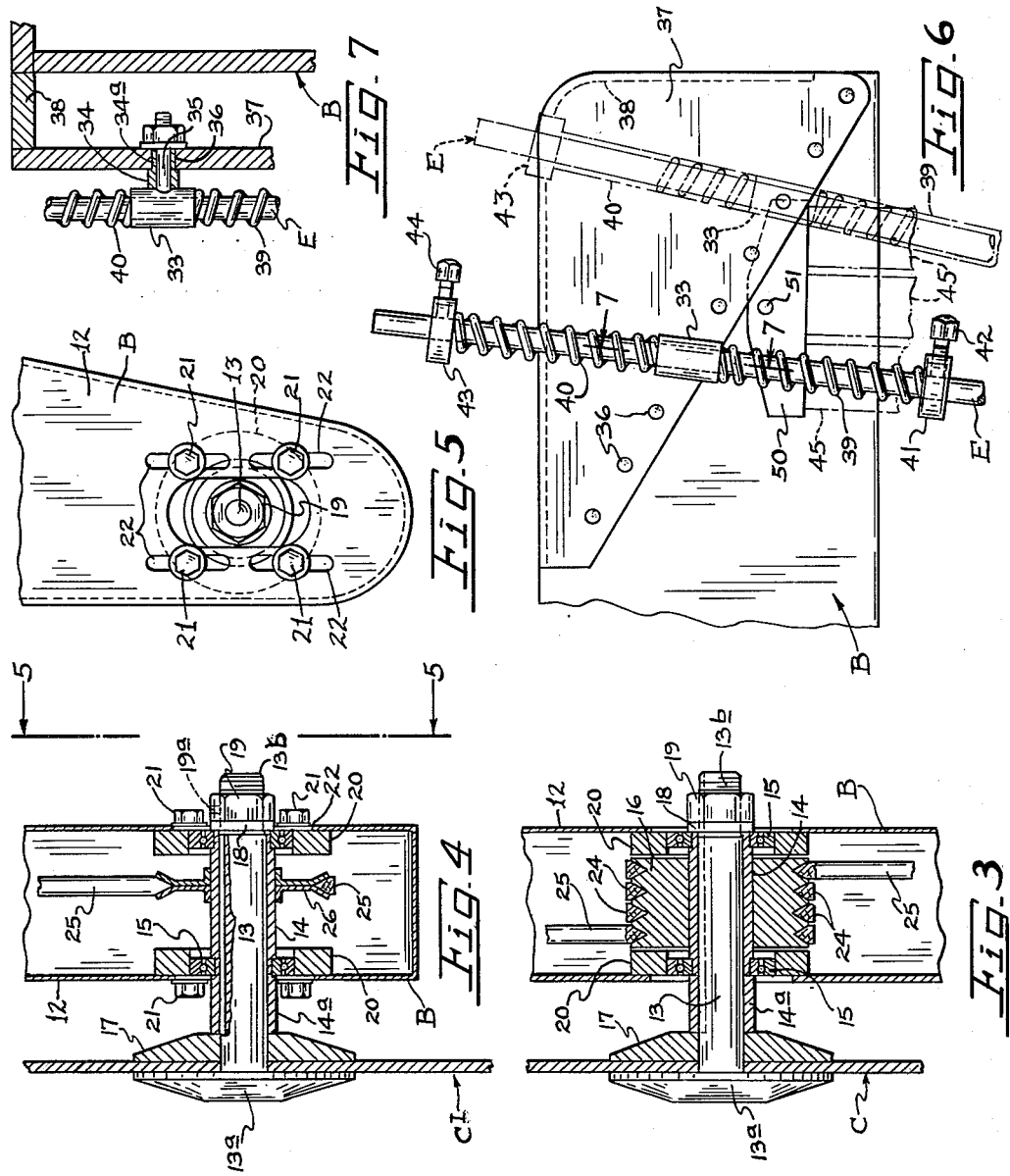

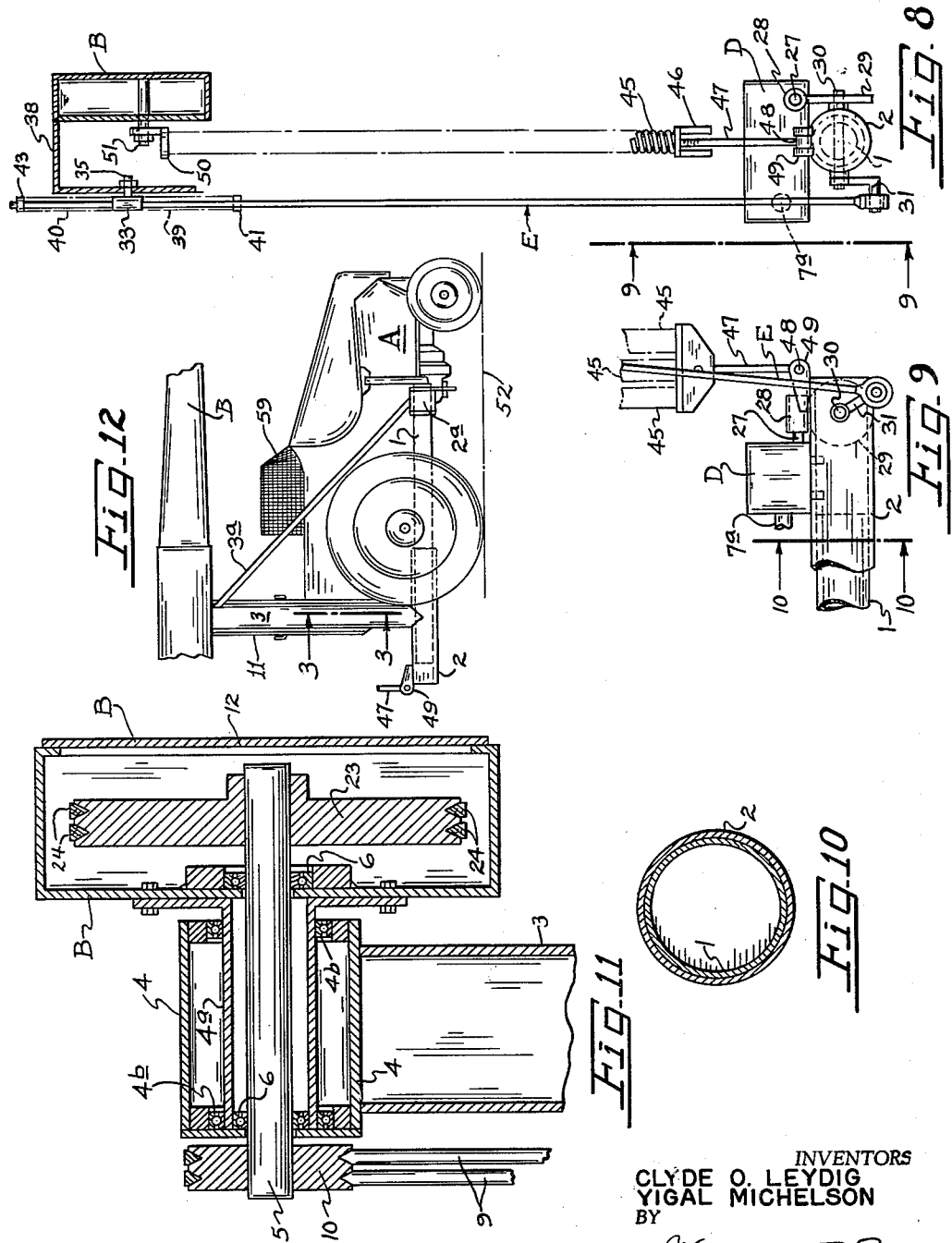

United States Patent Office 3,192,695
Patented July 6, 1965

3,192,695
TREE TRIMMING MACHINE OR THE LIKE
Clyde O. Leydig and Yigal Michelson, both of P.O. Box 276, Exeter, Calif.
Filed Feb. 25, 1963, Ser. No. 260,477
4 Claims. (Cl. 56—235)

The present invention relates to improvements in a tree trimming machine and it consists in the combinations, constructions and arrangements hereinafter described and claimed.

An object of our invention is to provide a tree trimming machine which is designed primarily to prune the sides of trees, such as fruit or nut trees. The trimming machine functions like a hedger for trees and it has an oscillating boom pivotally mounted on a powered vehicle such as a tractor. The boom has its forward end T-shaped with the plane of the T-portion extending at right angles to the pivotal axis of the boom. A plurality of circular rotatable saws are carried by the T-portion of the boom. These saws are moved vertically through an arc caused by the oscillations of the boom and the saws rotate at a high speed about their axes while thus moved.

A further object of our invention is to provide a device of the type described in which the stroke of the oscillating boom can be varied in length while causing the lowest position of the boom swing to remain at the same height above the ground regardless of the length of the swing. This permits the saws on the boom to start their cutting stroke at a predetermined height above the ground and the front end of the boom can swing upwardly and carry the rotating saws therewith to cut to a predetermined top height. If taller trees are to be trimmed, the stroke of the front end of the boom can be lengthened to increase the amplitude of the swing while still maintaining the lowest portion of the cutting arc at the same height above the ground as formerly. It is also possible to change the lowest point of the cutting arc and to raise it to a higher point above the ground. The amplitude of the cutting arc through which the boom swings can remain the same although the cut will start at a higher point above the ground and will have its uppermost point at still a higher level above the ground. In this way trees may have their upper portions trimmed and the saws need not be moved through a low portion of a stroke where the saws will not be cutting any portion of the tree or other object.

A further object of our invention is to provide a device of the type described which is a unitary structure and can be readily mounted on a powered vehicle such as a tractor. The device can be tilted laterally with respect to the tractor and novel means is provided for swinging the device about a longitudinal axis so as to incline the tower to the desired extent, the tower pivotally supporting the boom. By this arrangement the boom can be moved laterally to make a vertical cut even through the tractor is inclined with respect to the tower and boom because it is moving over uneven ground. Also the tower and boom can be tilted laterally with respect to the tractor when the operator desires to make an inclined cut on the tree or other object and the tractor is moving over level ground.

A further object of our invention is to provide a device of the type described in which an auxiliary disc cutter can be mounted on the boom at a point above the uppermost disc cutter carried by the boom. Novel means is provided for swinging the auxiliary cutter into operative position for increasing the effective length of the cut being made by the oscillating boom and the rotating saws. When the auxiliary cutter disc is not needed, it may be swung into an inoperative position where it will not extend above the upper most circular saw on the boom.

Still a further object of our invention is to provide a novel shaft assembly for supporting each circular saw. The shaft assembly includes a shaft that is keyed to a main sleeve that is rotatably supported in bearings adjustably carried by the boom. A nut is screwed onto the threaded end of the shaft and secures the shaft to the main sleeve while at the same time forcing the sleeve into an abutting engagement with a spacing sleeve for moving the latter against a washer on the shaft and forcing this washer into frictional engagement with the adjacent surface of the disc saw, mounted on the shaft. The shaft has an integral head disposed opposite to the threaded shaft end and the head frictionally contacts with the opposite surface of the disc saw. The disc saw is placed near one side of the boom while the nut on the shaft is placed near the opposite side. The nut when tightened will not interfere with the free rotation of the main sleeve. An unscrewing of the nut will permit the saw assembly to be removed from the main sleeve as a unit. The nut will have no tendency to become accidently loosened when the disc saw takes shock loads either forward or reverse. Moreover the nut is disposed on the opposite side of the boom from the saw and therefore will not be contacted by the material being cut from the tree or other object.

Other objects and advantages will appear as the specification continues. The novel features of the invention will be set forth in the appended claims.

In the drawings:

FIGURE 1 is a side elevation of our hedger.

FIGURE 2 is a vertical transverse section taken along the line 2—2 of FIGURE 1.

FIGURES 3 and 4 are enlarged vertical sections taken along the lines 3—3 and 4—4 of FIGURE 1, and illustrate the mounting of the disc saws on their shafts.

FIGURE 5 is an elevation of FIGURE 4 when looking in the direction of the arrows 5—5 of FIGURE 4.

FIGURE 6 is an enlargement of the circled portion 6 of the device shown in FIGURE 1.

FIGURE 7 is a transverse section taken along the line 7—7 of FIGURE 6.

FIGURE 8 is a rear elevation of a portion of the device shown in FIGURE 1 and shows the coil spring connection with the oscillating boom. This figure is on a larger scale and shows the parts as when looking in the direction of the arrows 8—8 of FIGURE 1.

FIGURE 9 is a side elevation of FIGURE 8 and is taken along the line 9—9 of FIGURE 8.

FIGURE 10 is an enlarged cross-sectional view of FIGURE 9 and is taken along the line 10–10 of FIGURE 9.

FIGURE 11 is a vertical section on an enlarged scale and is taken along the line 11—11 of FIGURE 1.

FIGURE 12 is a slide elevation of the tractor from the opposite side shown in FIGURE 1, and illustrates the manner of mounting the hedger on the tractor.

FIGURE 13 shows a modified form of the invention where the T-shaped oscillating boom is provided with an auxiliary cutter disc that may be moved into operative or inoperative position.

FIGURE 14 is a front elevation of FIGURE 13 when looking in the direction of the arrows 14—14 of FIGURE 13.

While we have shown only the preferred form of our invention, it should be understood that various changes, or modifications, may be made within the scope of the annexed claims without departing from the spirit thereof.

*Detailed description*

In carrying out our invention we make use of a tractor indicated generally at A in FIGURE 1. This tractor has a tubular member 1 that extends along one side of the tractor and projects rearwardly therefrom. The tubular member 1 is shown in FIGURES 1, 8, 9, 10 and 12. It may be connected to the tractor by any means desired. A cylindrical outer housing 2 is rockably mounted on the tubular member 1 and it carries an upwardly extending tower 3 that is preferably cylindrical in cross-section. A sleeve 2a is rockably mounted on the tubular member 1, see FIGURE 12, and this sleeve is held against longitudinal movement along the tubular member by outwardly extending flanges that are integral with the tubular member. A bracing strut 3a for the tower 3 has one end welded to the sleeve 2a and its other end welded to the tower near its top. Later on in the description we will describe how the tower 3 can be rocked laterally on the tubular member 1, the cylindrical outer housing 2 and the sleeve 2a rotating on the tubular member as a unit during this movement.

FIGURES 2 and 11 illustrate how the upwardly extending tower 3 carries a cylindrical casing 4 at its upper end whose axis extends at right angles to the axis of the tower 3. A cylindrical member 4a is rotatably mounted in the cylindrical casing 4 and is supported by bearings 4b. This cylindrical member 4a has one end projecting beyond an end of the casing 4 and this end is provided with a flange that is secured to a T-shaped boom B, for supporting it. A horizontal shaft 5 is mounted in bearings 6 which in turn are mounted in the cylindrical housing 4 and in the boom B.

A power take-off shaft 7 extends rearwardly from the tractor A, see FIGURE 1, and it is operatively connected to the horizontal transverse shaft 5 by a pulley 8 mounted on the shaft 7. A double-belt drive 9 and a second pulley 10 complete the connection to the shaft 5. The axis of the pulley 8 extends at right angles to the axis of the pulley 10 and the double-belt drive 9 interconnects the two pulleys and causes the shaft 5 to rotate at the same speed as the shaft 7. The double-belt drive 9 together with the pulleys 8 and 10 are preferably housed within a protective casing 11 that is U-shaped in cross section and is supported by the tower 3.

The oscillating T-shaped boom B is supported by the cylindrical member 4a which in turn is rockably mounted in the cylindrical casing 4. FIGURE 1 shows the T-shaped boom as extending forwardly from the upwardly extending tower 3 and also as having a portion extending rearwardly from the tower. The head 12 of the boom B which is really the "T" portion of the boom is provided with a plurality of disc saws C, see FIGURE 1. We show one disc saw C as being mounted at the juncture of the T-portion 12 of the oscillating boom B with the stem portion. In FIGURE 3, we show a portion of the center disc saw C, on an enlarged scale and illustrate how it is mounted in the T-shaped boom B.

A disc saw supporting shaft 13 is keyed to a main sleeve 14 which in turn is rotatably mounted in the boom B and is supported by bearings 15. The length of the main sleeve 14 is equal to the distance between the inner surfaces of the side walls of the boom B. A four-grooved pulley 16 is keyed to the main sleeve 14. The outer races of the bearings 15 are carried by bearing housings 20 that contact with the inner surfaces of the side walls of the boom. The bearing housings 20 can be moved within the boom to move the pulley 16 and tighten the belts 24 that connect this pulley with the pulley 23. The main sleeve 14 is no longer than the distance between the inner surfaces of the side walls of the boom and therefore the main sleeve will not interfere with the adjustment of the bearing housings 20 in the boom. Cap screws 21, see FIGURE 5, are received in slots 22 and enter threaded openings in the bearing housings 20 for securing these housings to the boom B in adjusted position.

The shaft 13 for the disc saw C is keyed to the main sleeve 14 and the shaft has an integral head 13a against which the saw disc can bear, see FIGURE 3. A washer 17 is mounted on the shaft 13 and is moved against the disc saw C. A spacing sleeve 14a is mounted on the shaft 13 and is moved against the washer 17. The shaft 13 is now moved into the main sleeve 14 and is keyed thereto so that a rotation of the sleeve will rotate the shaft. The spacing sleeve 14a will abut the adjacent end of the main sleeve 14. The spacing sleeve 14a could have a beater, not shown, welded thereto whose arms would lie in a plane paralleling the plane of the disc saw C. If the beater is used, the spacing sleeve 14a would also be keyed to the shaft 13 so as to be positively rotated thereby and the rotating beater would aid in clearing the saw and boom of cut material.

The threaded end 13b of the shaft 13, projects beyond the end of the main sleeve 14 when the shaft is assembled in the sleeve. A washer 18 is mounted on the end of the shaft 13 and bears against the adjacent end of the main sleeve 14. A nut 19 is threaded onto the threaded portion 13b of the shaft 13 and presses the washer 18 against the sleeve 14 and draws the integral head 13a of the shaft to the right in FIGURE 3 for tightening the disc saw C, spacing sleeve 14a and main sleeve 14, into a single unit that will be rotated by the rotating main sleeve 14. The sleeve 14 is held against longitudinal movement and in turn will hold the shaft 13 and associate parts from longitudinal movement. The nut 19 can be tightened to hold the parts in place and it will not bind against the bearings 15. The sleeve 14 will be free to rotate regardless of how tight the nut 19 has been screwed against the washer 18. The washer merely presses against the end of the sleeve 14 and not the bearing 15.

The nut 19 is disposed on the opposite side of the boom B from the disc saw C. Therefore the unit will not come into contact with any of the material being cut and this material can not tend to unscrew the nut. The arrangement of the parts permits the disc saw C to take the shock loads forward and reverse during the cutting operation without the nut 19 becoming unscrewed. If the disc saw C should strike an obstruction that would tend to slow it down, the belts 24 would merely slip on the pulley 16. The shaft 13 can be removed from the main sleeve 14 when desired and a removal of the nut 19 will permit this removal.

The means for rotating the shaft 13 include a large two-grooved pulley 23 mounted on the shaft 5, see FIGURE 11, and two endless V-belts 24 extending forwardly from the pulley 23 and along the stem portion of the boom toward the smaller four-grooved pulley 16. The dual belts 24 will connect with the middle grooves of the pulley 16 to cause it to rotate and in turn to rotate the shaft 13 and the cutter C. There is a ratio of two and one half to one speed up between the pulley 23 and the pulley 16 so as to cause the pulley 16 to rotate two and one half times faster than the pulley 23. We do not wish to be confined to this exact speed ratio between these pulleys.

We provide additional disc saws C1 at the ends of the T-shaped portion and one of these saws and its support is illustrated in detail in FIGURES 4 and 5. The mounting for the disc saw C1 is the same as that already described for the mounting of the disc saw C, illustrated in FIGURE 3, and therefore like reference numerals will be applied to similar parts. The nut 19 may be locked in place by a set screw 19a, see FIGURE 4. The head 13a of the shaft 13 has a conical portion that will allow the head to pass over cut limbs without damaging them. The nut 19 is placed on the opposite side of the boom B, from the saw and will not damage the tree.

In FIGURE 4, one endless belt 25 is passed around a pulley 26 that is keyed to the main sleeve 14. This belt 25 is passed around one of the outer grooves in the pulley 16. The rotation of the shaft 13 by the belt 25 in FIGURE 4 will rotate the disc saw C1. The other disc saw C1, mounted at the opposite end of the "T" portion of the boom B shown in FIGURE 1, will be rotated by another belt similar to the belt 25 that operatively connects the pulley 16 to the pulley 26. A rotation of the drive shaft 7 will therefore rotate the center disc saw C and the two end disc saws C1 at a high speed.

We will now describe the mechanism for oscillating the T-shaped boom and for changing the magnitude of the swing of the boom about the shaft 5 as a pivot. In FIGURE 1 we show the drive shaft 7 operatively connected to a variable drive mechanism indicated generally at D. Referring to FIGURE 9, it will be seen that the variable drive mechanism D has a shaft 27 extending therefrom and this shaft has a worm 28 keyed thereto.

Both FIGURES 8 and 9 illustrate the worm 28 meshing with a worm gear 29, the latter being mounted on a shaft 30. The shaft is rotatably carried by the cylindrical housing 2. A crank 31 is rotated by the shaft 30 and FIGURE 1 illustrates a pitman E having its lower end pivotally connected at 32 with the crank arm 31. The upper end of the pitman E is slidably received in a sleeve 33 and this sleeve is shown on a larger scale in FIGURES 6 and 7. In FIGURE 7 the sleeve 33 is shown provided with a bushing 34 that is integral with the sleeve and extends at right angles to the longitudinal axis of the sleeve. A threaded stud 35 is also integral with the sleeve and is received in the bushing 34. The bushing 34 has a reduced cylindrical portion 34a that is rockably received within an opening 36 provided in a plate 37 that is connected to the rear end of the oscillating boom B by a L-shaped web 38 that is welded to the plate 37 and to the boom B, see FIGURES 7 and 8. The plate 37 is provided with a row of openings 36, see FIGURES 1 and 6, that are spaced from each other.

The pitman E is yieldingly connected to the sleeve 33 by coil springs 39 and 40 which in turn are mounted on the pitman. The lower coil spring 39 bears against the lower edge of the sleeve 33 and has its other end bearing against a collar 41 that is adjustably mounted on the pitman and is secured in adjustable position by a set screw 42 or other suitable fastening means. The upper coil spring 40 has its lower end bearing against the top of the sleeve 33 and its upper end bears against another collar 43 that can be adjusted along the pitman E and held in adjusted by a set screw. The arrangement is such that a rotation of the crank 31 will reciprocate the pitman E and the pitman in turn will oscillate the boom B and the movement of the pitman to the boom will be yieldingly applied through the coil springs 39 and 40. The springs 39 and 40 are shock springs and will ease the strain on the crank 31 as the latter reciprocates the pitman E and causes it to oscillate the boom.

It will be noted from FIGURES 1 and 6 that the row of openings 36 in the plate 37, extend at an angle with respect to the upper and lower walls of the portion of the boom B that projects rearwardly from the pivot shaft 5 for the boom. The angle made by the row of openings 36 has been predetermined so that as the sleeve 33 is moved to an opening 36 disposed nearer to the pivot shaft 5, the swing of the T-shaped head 12 of the boom B will be increased, but the lowermost point of the arc made by the swinging boom will remain at the same height above the ground 52, regardless of which opening 36 is chosen. If for example in FIGURE 1, the sleeve 33 is moved to the left end and its bushing 34 is received in another opening 36, the right hand end of the boom from the pivot bolt 5 will be swung downwardly and the left hand end will be swung upwardly through the same angle. This adjustment will permit the boom B to be swung through a greater arc and still the lowest point of the swing of the T-shaped head 12 will be at the same height above the ground as it was before the adjustment was made. With this arrangement, trees or other objects of different heights can be trimmed and the amplitude of the swing of the boom can be adjusted to equal the height of the tree. In this way the length of the cut can be adjusted to the height of the tree and there is no lost motion where the boom head will be moving and the rotating saws will be cutting no material.

It is also possible to maintain the same amplitude of swing of the boom B, and have the cutting action take place at different elevations above the ground. For example for the pivotal connection of the pitman E with the boom B at the place shown in FIGURE 1, the boom will have a definite angle of swing when the pitman is reciprocated by the crank 31. The lowest point of the swing will be at a certain height above the ground and the full swing of the boom will be from this point and upward. If now the operator wishes to trim trees or other objects at a higher point above the ground, but does not wish to increase the amplitude of the swing of the boom, he loosens the cap screws 42 and 44 on the collars 41 and 43, and moves these downwardly on the pitman to a new position and then secures them in place. This will move the sleeve 33 downwardly on the pitman into a new position and will swing the boom clockwise about the pivot bolt 5 and raise the T-shaped head of the boom. The pitman E will oscillate the boom B through the same length of arc as formerly, but the lowest point of the arc will start at a higher elevation above the ground and the entire cutting length of the arc will remain the same although carried out at a higher position on the tree or other objects.

The trees that need trimming are of various sizes and shapes. If the lower branches to be trimmed are fairly near to the ground level, the pitman E can have its sleeve 33 connected to the right opening 36 to bring the lowest point of the cutting arc where the lowest disc saw C1 will trim these lower branches. If the height of certain trees is greater than other trees and yet the lower branches of these trees are at about the same height above the ground, the amplitude of the swing of the boom B can be increased by connecting the sleeve 33 to an opening 36 disposed nearer to the pivot bolt 5 for the boom. This will increase the cutting arc travelled by the disc saws while maintaining the lowest point of the cutting arc at the same height above the ground as formely. Finally if the trees to be trimmed have their lower branches start at a higher point above the ground, the sleeve 33 can be moved downwardly on the pitman by lowering the two collars 41 and 42 and securing them in their new positions. This will raise the front end of the boom and the pitman E will swing the boom through the same arc, but at a higher elevation. In this simple way the device may be adjusted to trim trees of all manner of shapes and sizes and the length of the cutting stroke as well as the place where the cutting is to be performed on the tree can be changed so that no time will be lost in moving the saws through portions of their strokes where there are no branches to be trimmed.

The boom B is counter-balanced so that the pitman E will have less work to do in oscillating the boom. In FIGURE 1 the portion of the boom B extending in front of the shaft 5 is longer than the portion of the boom extending rearwardly from the shaft 5. Furthermore the forwardly extending portion of the boom has the T-shaped head 12 that carries the three disc saws C and C1. The heavy weight of these saws and the weight of the T-shaped head 12 is counter-balanced by a plurality of heavy springs 45, see FIGURE 1. We show three coil springs although we do not wish to be confined to this particular number. The lower ends of the coil springs 45 are connected to a lower header 46. Both FIGURES 1 and 8 illustrate the lower header 46 as being connected to the cylindrical outer housing 2 by means of a bolt 47 that has a threaded connection with the header. The bolt 47 has a pivotal connection at 48 with a bracket 49 that is secured to the cylindrical outer housing 2 by any means desired such as welding.

The upper ends of the three coil springs 45 are connected to an upper header 50 which in turn is pivotally connected to the boom B at 51. The pivot 51 for the upper header 50 is in reality a bolt 51 which is carried by the boom B, see FIGURE 8. The tension on the springs 45 can be adjusted by means of the bolt 47 so that the T-shaped head 12 and the disc saws C and C1 on the boom B will be substantially balanced by the pull on the springs 45.

It is possible to swing the tower 3 laterally about the longitudinal axis of the cylindrical outer housing 2 as a pivot as clearly shown in FIGURE 2. To accomplish this, the outer cylindrical housing 2 has an arm 53 rigidly connected thereto. A clevis 54 is pivotally connected to the arm 53 at 55. A threaded rod 56 is rigidly secured to the clevis 54 and extends upwardly therefrom. This rod has its upper end slidably received in a sleeve 57 and the sleeve is secured to a part of the tractor A. A hand crank 58 has a threaded bore for receiving the threaded portion of the rod 56.

It will be seen from this construction that a rotation of the hand crank 58 in one direction will raise the rod 56 to swing the arm 53 in a clockwise direction for causing the housing 2 to rock on the cylindrical support 1 and to move the tower 3 into the dot-dash line position shown in FIGURE 2. This movement will swing the T-shaped head of the boom B into an inclined position and this will incline the central disc saw C and the outer disc saws C1. When the tractor moves over the ground 52 that is not horizontal, the operator may wish to swing the tower 3 into an inclined position with respect to the tractor, so that the tower itself will remain perpendicular to a horizontal plane. This will permit the circular saws to make a vertical cut regardless of the inclination of the ground 52.

Also if an angle cut is desired in trimming the trees, the tower 3 may be swung into the desired angular position and this will swing the disc saws into the same angular position. The operator can cause the disc saws C and C1 to cut at an angle of ten or fifteen degrees with respect to a vertical line extending through the longitudinal axis of the outer cylindrical housing 2. The lateral swinging of the tower 3 will cause all of the cutting mechanism to swing as a unit with the tower. The power take-off shaft 7 has a universal connection 60 with another shaft 7a, see FIGURE 1, that extends into the variable speed housing D, to operate the gearing therein. The universal connection 60, permits the housing D to move laterally when the tower 3 is moved and still the shaft 7a extending from the housing D will be operatively connected to the power take-off shaft 7.

*Operation*

From the foregoing description of the various parts of the device, the operation thereof can be readily understood. A screened canopy indicated generally at 59 is placed over the driver's seat so as to protect the driver. The driver operates the tractor in the usual manner. In addition he has a mechanism, not shown, which can be operatively connected to the tractor engine by shifting a control lever and this will cause the power take-off shaft 7 to rotate. The shaft 7 will then rotate the pulley 8, endless belts 9, pulley 10 and shaft 5, see FIGURES 1 and 11. The shaft 5 will rotate the pulley 23 and this pulley is operatively connected to the pulley 16 by the endless belts 24. FIGURES 1, 3 and 4 illustrate how the four grooved pulley 16 is operatively connected to the end pulleys 26 by the endless belts 25. The pulleys 26 rotate the two shafts 13 which are connected to the end disc saws C1. These saws are rotated at a high speed by the power take-off shaft 7 and the interconnecting mechanism just mentioned.

The variable drive mechanism D is supported by the cylindrical outer casing 2 and it rotates the shaft 27 at a much slower speed than the shafts 7 and 7a. The speed of the shaft 27 can also be regulated by the variable speed mechanism D. We have already mentioned how the shaft 27 reciprocates the pitman E through the mechanism consisting of the worm 28, worm gear 29, shaft 30 and crank arm 31, see FIGURE 8. The reciprocation of the pitman E will oscillate the boom B. In FIGURE 1 we have shown the boom B in a phantom view by the dot-dash lines in an angular position so as to indicate how the three disc saws C and C1 can be moved vertically through an arc while they are rotating at a high speed.

The operator drives the tractor A slowly between the row of trees and the rotating circular saws will prune the sides of the trees in the row of trees positioned on the right hand side of the tractor. The oscillation of the boom during the rotation of the saws will cause them to sweep upwardly and downwardly through a predetermined arc and effectively trim the portions of the trees to the desired extent. The tractor can be used on sloping ground and the tower 3 can be tilted laterally as shown in FIGURE 2 to compensate for the unevenness of the ground. The operator swings the tower laterally by manipulating the hand crank 58 in the manner already described in FIGURE 2. The tower 3 can be inclined if the operator wants to trim the trees at a slight angle. The device can be used as a hedger for objects other than trees if desired.

The oscillating boom B with its plurality of rapidly rotating in-line disc saws C and C1 mounted on the T-shaped head 12, will make a clean cut as the saws are reciprocated through an arc. Fewer disc saws are necessary when the saws are thus moved. The saws will be self-cleaning as they are moved up and down and cut limbs will be automatically removed when coming into contact with the rapidly rotating saws. Beaters, not shown, could be added if desired and mounted on the spacing sleeves 14a which would be keyed to the shafts 13 so as to positively rotate the beaters. Such beaters would aid in cleaning the space between the disc saws and the adjacent wall of the boom of any cut material.

In FIGURES 13 and 14, we show the T-shaped head 12 of the oscillating boom B provided with an auxiliary cutter disc C2 if the operator wishes to extend the cutting height of the saws to a point higher than the top saw C1 can reach. In FIGURE 14 we show a fork-shaped arm F having its bifurcated end F1 straddling the upper end of the T-shaped head 12 of the boom B. The bifurcated end F1 has its leg portions pivotally mounted on the upper shaft 13 so that the arm can be swung from the full line position shown in FIGURE 13 into the inoperative position indicated by the dot-dash lines in the same figure. We provide a sleeve 61 that receives a shaft 62. The shaft 62 carries the auxiliary disc saw C2. The shaft 62 is operatively connected to the shaft 13 by a pulley and belt drive mechanism indicated generally at 63. A housing 64 encloses the pulley and belt drive mechanism.

In FIGURE 13 we show a hydraulic cylinder G and this cylinder has one end pivotally secured to the T-shaped head of the boom B by a pivot bolt 65. A piston rod 66 extends from the hydraulic cylinder G and has its outer end pivotally connected at 67 to the fork-shaped arm F. Hydraulic lines 68 and 69 lead to opposite ends of the hydraulic cylinder G and they extend to a source of fluid under pressure, not shown, in the present drawings. The operator has a control knob, not shown, that he can manipulate for causing fluid to enter the hydraulic cylinder G through the line 68 when he wishes to swing the arm F and its cutter C2 into operative position. When the cutter is in this position it will be rotated with the other cutters and will extend the effective cutting height of the hedger.

The auxiliary cutter C2 can be swung into inoperative position. To accomplish this the operator manipulates the control, not shown, for causing hydraulic fluid under pressure to enter the top of the cylinder G through the line 69 and to flow out through the lower end of the cylinder through the line 68. The piston, not shown, will move downwardly in the cylinder G and will retract the piston rod 66 and this will cause the arm F to swing from the full line position shown in FIGURE 13 into the dot-dash line position. The mechanism just described is one way of moving an auxiliary disc saw C2 into and out of operative position. We do not wish to be limited to this exact structure.

Our invention is a compact light weight hedger which has great maneuverability in tight and narrow planted groves, (which usually require more pruning than the wide planted ones) regardless of ground condition, and the type, size or age of the trees. It is designed to give a better and more accurate clean cut without any breakage or damage being done to the pruned trees, and it will cut through the heaviest wood up to a full height of eighteen feet and at a desired angle of hedging from vertical 90° to 75°. The hedger is mounted on a small tractor and powered by the tractor engine through a power take-off unit. This arrangement enables the hedger to be mounted on the tractor when used for seasonal work.

The main support for the hedger; i.e., the tubular member 1, is attached to the tractor A at two points; at the bottom of the gear box and on the back axle. The tubular member 1 is used also as a hinge or pivot for the entire hedger frame or tower 3. The tower can be tilted laterally by means of the long adjustable screw or threaded rod 56 to the desired degree. This type of tilting mechanism assures that the drive mechanism will remain in operative connection with the disc saws regardless of the angle of tilt of the hedger. Furthermore, by getting the pivot point for the lateral tilting of the hedger as close to the ground as possible, we are assured of the same width of cutting at the desired hedging degree in relation to the tractor.

The boom tower 3 is extended upwardly from the tubular member 2 and is disposed on the right hand side of the tractor when facing it from the back. This mounting assures that the hedger will cut its way clear on the right hand side of the tractor regardless of the angular position of the hedger. The left hand side of the tractor is shielded in a tapered and smooth way, so it can easily wedge itself through the tightest orchards without causing any damage to the trees. As already stated, the main boom is T-shaped. It is hinged to the tower about nine feet above the ground so that the swing of the boom can be increased to cut the full heights of eighteen foot trees. The actual cutting by the disc saws on the boom B is accomplished at a point ahead of the tractor and the operator so that he can have full control of the cutting operation at all time. The rapidly rotating saws on the oscillating boom will reach and cut the limbs before the latter can be bent over to a point that they will be under springy tension. If the saws contact the limbs while they are under tension, it will cause the saws to produce a rough cut and a long split will be formed in the limbs. The main boom B and the saw assembly are balanced on the hinge point 5 on the tower by means of the three tension adjustable long springs 45, which will cause the two arms of the boom on each side of the pivot point 5 to substantially balance each other.

The three or more saws are mounted in line to assure a clean cut. To overcome the gap in between adjacent saws, the boom B is oscillated by means of the crank 31. This also provides a cutting action into the trees and prevents any plugging up of the saws because this oscillating boom will shake the already cut brush from it. A clean cut is assured. By changing the pitman E anchoring point 36 in relation to the main boom B pivoting point 5, we can vary the heights of the cutting by altering the length of the arcuate swing of the boom. By changing the effective length of the pitman we can vary the lowermost position at which the lowest rotating saw cuts with respect to the ground. The cushioning springs 39 and 40 on the pitman E assures easy and shock-free cutting through the heaviest wood on the trees or other objects.

By using large diameter saws C and C1 that are thirty-six inches in diameter, we gain a few important features:

(a) We can reach further into the trees that are being pruned;
(b) There is more rim speed for less shaft revolutions per minute;
(c) There are more teeth per saw;
(d) There is a fly wheel action due to the large diameters of the saws; and
(e) There are less moving parts.

To accomplish all of these features we developed the special saw shaft assembly already described. Such an assembly provides greater safety and it can take shock loads either way; i.e. cutting shock or fly wheel action shock, regardless of whether the threads on the shaft 13 are left or right hand threads. Only the nuts 19 project on the side of the boom B disposed opposite to the side having the disc saws. This provides a smoother outer side and prevents damage being done to the trees.

The fourth saw C2 can be used as an attachment for pruning taller trees and it can be swung rearwardly and downwardly by means of the hydraulic cylinder G for transport position or for passing under low wires or other obstructions.

We claim:
1. In combination:
   (a) a T-shaped boom having a vertically extending head and a horizontal stem portion both being integral with each other;
   (b) means for pivotally supporting said stem so that the T-shaped head lies in front of the pivot supporting means and so that a portion of said stem lies on the side of said pivot supporting means opposite said head and in a plane that is normal to the pivotal axis and the stem can be swung into an angular position from the horizontal;
   (c) a plurality of disc-shaped saws rotatably carried by said T-shaped head and arranged vertically one above another and with at least one disc saw positioned below said stem and at least one disc saw positioned above said stem; said saws lying in a common plane that is normal to the pivotal axis and having portions projecting in front of said T-shaped head;
   (d) means for oscillating said boom in a substantially vertical plane and including a reciprocating pitman;
   (e) a crank for reciprocating said pitman;
   (f) a sleeve slidably mounted on said pitman and having a trunnion that extends at right angles to the pitman axis;
   (g) yielding means for limiting the movement of said sleeve on said pitman;
   (h) said stem having a row of trunnion-receiving openings lying in a line that is disposed on the stem portion that lies on the opposite side of the pivot from said head portion; said line of openings extending away from said pivot but being inclined so that the opening disposed nearest to said pivot is disposed farthest from said crank and the opening disposed farthest from said pivot is disposed nearest to said crank;
   (i) whereby said trunnion is mounted in a selected opening in said stem for altering the amplitude of the swing of said boom; said trunnion when placed in said opening disposed nearest to said boom pivot causing said pitman to swing said boom through its greatest arc with one end of the arc lying in a horizontal plane that extends between said pivot and said crank; and said trunnion when placed in said opening disposed farthest from said boom pivot causing said pitman to swing said boom through its smallest arc with the same end of the arc lying substantially in the same horizontal plane.

2. In combination:
(a) a T-shaped boom having a vertically extending head and a horizontal stem portion both being integral with each other;
(b) means for pivotally supporting said stem so that the T-shaped head lies in front of the pivot supporting means and in a plane that is normal to the pivotal axis and the stem can be swung into an angular position from the horizontal;
(c) a plurality of disc-shaped saws rotatably carried by said T-shaped head and arranged vertically one above another and with at least one disc saw positioned below said stem and at least one disc saw positioned above said stem; said saws lying in a common plane that is normal to the pivotal axis and having portions projecting in front of said T-shaped head;
(d) means for oscillating said boom in a substantially vertical plane and including a reciprocating pitman;
(e) a crank for reciprocating said pitman;
(f) a sleeve slidably mounted on said pitman and having a trunnion that extends at right angles to the pitman axis;
(g) means for pivotally mounting said trunnion in said boom at a distance from said boom pivot;
(h) yielding means for limiting the movement of said sleeve on said pitman and including a coil spring disposed on each side of said sleeve and being mounted on said pitman;
(i) a pair of collars mounted on said pitman; one collar bearing against the outer end of one spring and the other collar bearing against the outer end of the spring; and
(j) adjustable means for securing said collars to said pitman after said sleeve has ben moved along said pitman into the desired position; whereby said boom can be caused to oscillate through the same arc but at different angular positions about said boom pivot.

3. In combination:
(a) a vehicle movable over the ground;
(b) a T-shaped boom having a head facing in the direction of movement of the vehicle and a stem portion pivotally mounted on an axis that extends transversely to the direction of vehicle movement; said T-shaped head lying in a plane that is normal to the pivotal axis of said boom and being narrow in width;
(c) a plurality of disc-shaped saws rotatably carried by said T-shaped head with at least one disc saw positioned below said stem and at least one disc saw positioned above said stem; said saws lying in a common cutting plane that is normal to said pivotal axis and having portions projecting in front of said T-shaped head; whereby said saws will cut in advance of said T-shaped head;
(d) means for oscillating said boom about its pivotal axis for reciprocating said saws in an arc that lies in the plane common to said saws;
(e) means for rotating said saws during the oscillation of said boom;
(f) an arm pivotally mounted on the upper end of the T-shaped head;
(g) an auxiliary disc saw rotatably carried by the outer end of said arm;
(h) means for swinging said arm for swinging said auxiliary saw into alignment with the other saws carried by said T-shaped head;
(i) means operatively connecting said auxiliary saw to said means for rotating said first-mentioned saws, whereby said auxiliary saw will also be rotated; and
(j) said arm swinging means being adapted to swing said arm rearwardly about its pivot for moving said auxiliary saw into inoperative position.

4. In combination:
(a) a vehicle movable over the ground;
(b) a T-shaped boom having a vertically extending head facing in the direction of movement of the vehicle and a rearwardly extending and horizontally positioned stem portion pivotally mounted on a substantially horizontal axis that extends transversely to the direction of vehicle movement; said T-shaped head lying in a substantially vertical plane that is normal to the pivotal axis of said boom and being narrow in width;
(c) a plurality of disc-shaped saws rotatably carried by said T-shaped head and arranged vertically one above another and with at least one disc saw positioned below said stem and at least one disc saw positioned above said stem; said saws lying in a common cutting plane that is normal to said pivotal axis and having portions projecting in front of said T-shaped head; whereby said saws will cut in advance of said T-shaped head;
(d) means for oscillating said boom about its pivotal axis for reciprocating said saws in an arc that lies in the plane common to said saws;
(e) means for rotating said saws during the oscillation of said boom;
(f) an arm pivotally mounted on the upper end of the T-shaped head;
(g) an auxiliary disc saw rotatably carried by the outer end of said arm;
(h) means for swinging said arm for swinging said auxiliary saw into alignment with the other saws carried by said T-shaped head;
(i) means operatively connecting said auxiliary saw to said means for rotating said first-mentioned saws, whereby said auxiliary saw will also be rotated; and
(j) said arm swinging means being adapted to swing said arm rearwardly about its pivot for moving said auxiliary saw into inoperative position.

References Cited by the Examiner
UNITED STATES PATENTS

| | | | |
|---|---|---|---|
| 877,392 | 1/08 | Zeitinger | 143—45 |
| 1,015,590 | 1/12 | Saunders | 143—45 |
| 2,167,744 | 8/39 | Cosby et al. | 143—155 |
| 2,299,129 | 10/42 | Dickenson et al. | 143—43 |
| 2,365,408 | 12/44 | Hillyer | 143—43 |
| 2,586,530 | 2/52 | Godfrey | 143—155 |
| 2,926,480 | 3/60 | Kimball | 56—235 |
| 2,940,486 | 6/60 | Whitmore | 143—43 |
| 3,006,201 | 10/61 | Ross | 74—41 |

LESTER M. SWINGLE, *Primary Examiner.*

WILLIAM W. DYER, Jr., *Examiner.*